Dec. 17, 1929.  V. MARONNA  1,739,797
METHOD OF CONSTRUCTING THE SLEEVES OF GARMENTS
Filed Feb. 2, 1929
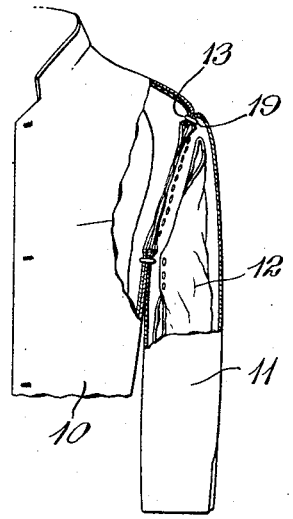
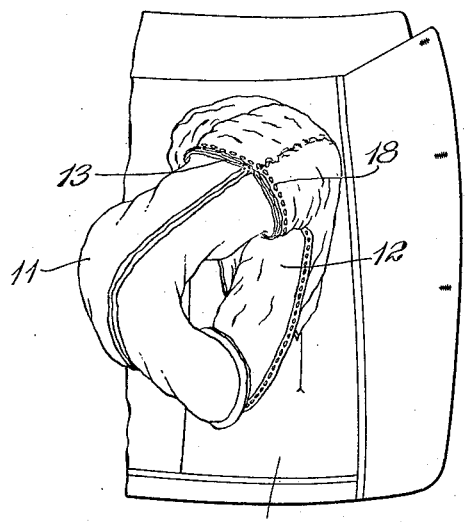
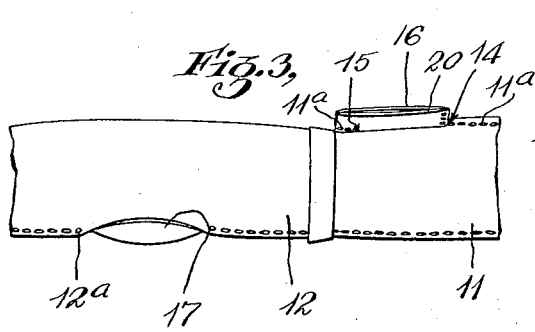
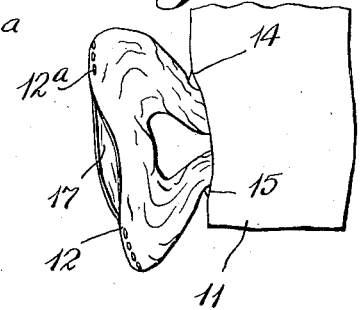
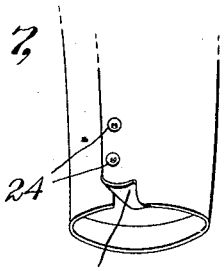
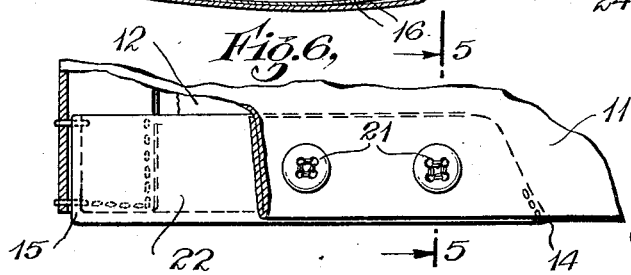
INVENTOR
Vincenzo Maronna
BY
ATTORNEY Patented Dec. 17, 1929

1,739,797

UNITED STATES PATENT OFFICE

VINCENZO MARONNA, OF NEW YORK, N. Y.

METHOD OF CONSTRUCTING THE SLEEVES OF GARMENTS

Application filed February 2, 1929. Serial No. 336,983.

This invention relates to coats and similar garments and particularly to the method of constructing the sleeves of such garments; and the object of the invention is to so construct the sleeve and its lining as to facilitate the machine stitching of the sleeve and lining, both in the formation of the several seams and in the attachment of the separate end portions of the lining to the end portions of the sleeve and body portion of the garment; a further object being to provide the sleeve lining with an opening through which the sleeve or a portion thereof may be passed when the sleeve is arranged within the coat structure so as to expose the arm hole portion of the garment, facilitating the attachment of the upper end of the lining thereto, and further to the provision of an opening at the lower end of the sleeve whereby the first named opening in the lining may be closed by machine stitching, the opening in said sleeve being closed by one or more sleeve buttons commonly employed at the lower end portion of the sleeve; and with these and other objects in view, the invention consists in the method of constructing the sleeves of garments of various kinds and classes as hereinafter more fully described and claimed.

The invention is fully disclosed in the following specification, of which the accompanying drawing forms a part, in which the separate parts of my improvement are designated by suitable reference characters in each of the views, and in which:—

Fig. 1 is a front and sectional view of a part of a coat illustrating the sleeve lining in position prior to its attachment to the arm hole portion of the coat.

Fig. 2 is an inside view of a part of the coat shown in Fig. 1, showing the method of attaching the sleeve lining to the arm hole portion of the coat.

Fig. 3 is a detail view showing the sleeve and sleeve lining attached at the lower end of the sleeve.

Fig. 4 is a detail view of the lower end portion of the sleeve with part of the lining withdrawn therefrom, showing the method of closing the opening provided in the lining.

Fig. 5 is a transverse, sectional view of the sleeve and lining when completely formed, the section being on the line 5—5 of Fig. 6.

Fig. 6 is a plan and sectional view of part of the lower end of the sleeve in its completed form; and, Fig. 7 is a detail view of the lower end of a sleeve showing a slight modification.

My method of constructing the sleeves of garments is an improvement on that shown, described and claimed by me in Letters Patent of the United States, No. 1,697,959, dated January 8, 1929, in which the specific method of attaching the sleeve lining to the upper end of the sleeve and arm hole portion of the coat is clearly set out. This same method of procedure is followed, including the provision of the opening in the sleeve lining; but my present invention relates to the method of closing the sleeve lining opening to provide a neat and finished appearance as well as a stronger construction, and also to render the detection of the machine stitching invisible.

In Figs. 1 and 2 of the drawing, I have indicated at 10 one side portion of a coat or jacket. At 11, I have shown one of the sleeves, at 12, the sleeve lining and at 13 I have shown the arm hole portion of the garment to which the sleeve and sleeve lining are attached.

In forming, assembling and mounting the sleeve and sleeve lining, I first attach the lower end of the sleeve 11 to the lower end of the lining 12 after said sleeve and lining have been formed. In accordance with the present invention as disclosed in Figs. 1 to 6 inclusive, one of the seams 11ª, namely the outer seam of the sleeve 11 is left unstitched between the points 14 and 15, and between said points the sleeve has projecting sleeve parts 16 which operate to form a neat and finished cuff structure as later described.

The seam 12ª of the lining 12 is also left unstitched to form a comparatively large opening 17 through which the sleeve 11, when arranged on the interior of the coat 10, may be passed to expose the arm hole portion 13 of the coat and the attached sleeve 11 to facilitate the machine stitching of the upper end of the lining to the arm hole portion and sleeve as indicated at 18 in Fig. 2 of the drawing. This process is identical with the process disclosed in the patent hereinbefore referred to, it being understood that the sleeve 11 is stitched to the arm hole 13 as seen at 19, Fig. 1, prior to the attachment of the lining.

After the lining has been secured in the manner shown in Fig. 2 of the drawing, the sleeve 11 is then replaced within the lining 12 and the sleeve is passed outwardly through the arm hole to assume its normal extended position. When in this position, the lining is drawn outwardly through the opening 20 formed between the points 14 and 15, and the sleeve extension 16, in the manner indicated in Fig. 4 of the drawing until the entire opening 17 in the seam 12ª of the lining 12 is exposed as indicated in said figure. When exposed, this opening is closed by machine stitching and the lining is replaced in the sleeve, thus rendering the detection of the opening or the process of forming the machine stitched sleeve and lining undetectable, even though the sleeve be inverted to expose the lining.

The last step in the process of completing the sleeve consists in attaching one, two or more buttons 21 to that part of the sleeve intermediate the points 14 and 15, the stitchings for securing the buttons in place passing through both of the extensions 16 as clearly seen in Fig. 5 of the drawing, it being understood that said extensions are folded inwardly into the sleeve forming round finished edges 22 at the exterior of the sleeve, as clearly seen in Fig. 5 of the drawing.

In the construction shown in Figs. 1 to 6 inclusive, the lower edges of the sleeve and lining are closed or fully attached. It is desirable however, in some styles of coats, to have a free or unattached edge or corner portion 23 at the lower end of the sleeve as indicated in Fig. 7 of the drawing, but this will in no way modify the structure of the sleeve or the method disclosed in the other figures of the drawing. The lining of the sleeve will be so attached as to leave the corner portions of the sleeve proper, free as indicated. An opening similar to the opening 20 is provided through which the sleeve lining may be drawn as in Fig. 4 of the drawing, and this opening will be closed by the buttons 24, the same as in the structure shown in Figs. 5 and 6.

It will be understood that my invention relates to the method of constructing the sleeves of garments by an all machine stitched process, wherein a material saving in labor is effected, and further by means of which a stronger and neater sleeve structure is produced. While I have referred to certain specific steps in carrying my improved method into effect and have illustrated certain forms of sleeve structures, that my invention is not necessarily limited in these respects, and various other changes in and modifications of the method herein set out may be made within the scope of the appended claims without departing from the spirit of my invention or sacrificing its advantages.

Having fully described my invention, what I claim as new and desire to secure by Letters Patent, is:—

1. The herein described method of closing the opening provided in a sleeve lining by machine stitching, said opening being provided to facilitate the machine stitching of the lining to the arm hole portion of the garment which consists in providing the sleeve with an opening along one of its seams, passing the attached lining outwardly through said sleeve opening to expose that part of the lining having the opening therein, closing said lining opening by stitchings, and then replacing the lining in said sleeve and closing said sleeve opening.

2. The herein described method of attaching a sleeve lining to the arm hole portion of a garment by machine stitching which consists in first arranging the attached sleeve on the interior of the garment, providing one of the seams of the lining with an opening intermediate the end portions thereof, passing the sleeve through said opening to expose the arm hole portion of the garment and the upper unattached end of the lining, stitching said end of the lining to the arm hole portion of the garment, then replacing the sleeve in said lining, providing one seam of the sleeve with an opening, drawing that part of the lining having the opening therein outwardly through the sleeve opening, stitching the lining to close the opening therein and then replacing the lining in said sleeve and then closing the sleeve opening.

3. The herein described method of attaching sleeve linings to garments by machine stitching which consists in providing the linings with openings, passing the sleeves through said openings to such degree as to expose the arm holes of the garment, then stitching the upper ends of the sleeve linings to said arm hole portions, forming an opening in one seam of each of the sleeves through which that portion of the linings having the openings therein are drawn to expose said openings, stitching said sleeve linings to close the openings therein and then closing the openings in the seams of said sleeves.

4. The herein described method of attaching sleeve linings to garments by machine stitching which consists in providing the linings with openings, passing the sleeves through said openings to such degree as to expose the arm holes of the garment, then stitching the upper ends of the sleeve linings to said arm hole portions, forming an opening in one seam of each of the sleeves adjacent the free ends thereof through which that portion of the linings having openings therein are drawn to expose said openings, stitching said sleeve linings to close the openings therein, and then attaching the usual sleeve buttons to close the openings in the seams of said sleeves.

5. The herein described method of attaching a sleeve lining to the arm hole portion of a garment by machine stitching which consists in first attaching the lower end of the sleeve to the lining, leaving an opening in one seam of the sleeve adjacent the lower end thereof and providing the lining with an opening intermediate its ends, then drawing the sleeve through the opening in said lining to expose the arm hole portion of the garment, then stitching the upper end of the sleeve to said arm hole portion, then arranging the lining within the sleeve and then extending that part of the lining having the opening therein outwardly through the opening in said sleeve and stitching the lining to close said opening, and then replacing the lining in the sleeve.

6. The herein described method of attaching a sleeve lining to the arm hole portion of a garment by machine stitching which consists in first attaching the lower end of the sleeve to the lining, leaving an opening in one seam of the sleeve adjacent the lower end thereof and providing the lining with an opening intermediate its ends, then drawing the sleeve through the opening in said lining to expose the arm hole portion of the garment, then stitching the upper end of the sleeve to said arm hole portion, then arranging the lining within the sleeve and then extending that part of the lining having the opening therein outwardly through the opening in said sleeve and stitching the lining to close said opening, then replacing the lining in the sleeve and then stitching buttons to the sleeve to close the opening in the seam thereof.

7. The herein described method of forming a seam on an attached lining of a sleeve which consists in forming said lining with an opening therein, forming one seam of the sleeve with an opening, drawing that part of the lining having the opening therein outwardly through said sleeve opening to expose the entire opening in said lining to permit the stitching thereof, stitching said lining to close the opening therein and to form an invisible stitch on said lining when replaced in said sleeve.

8. The herein described method of forming a seam on an attached lining of a sleeve which consists in forming said lining with an opening therein, forming one seam of the sleeve with an opening, drawing that part of the lining having the opening therein outwardly through said sleeve opening to expose the entire opening in said lining to permit the stitching thereof, stitching said lining to close the opening therein and to form an invisible stitch on said lining when replaced in said sleeve and forming of that part of the sleeve where the opening is arranged inwardly extending portions forming a finished closure for said sleeve opening.

In testimony that I claim the foregoing as my invention I have signed my name this 1st day of February, 1929.

VINCENZO MARONNA.